(12) United States Patent
Renkema

(10) Patent No.: US 9,430,354 B2
(45) Date of Patent: Aug. 30, 2016

(54) AGGREGATION OF METRICS FOR TRACKING ELECTRONIC COMPUTING RESOURCES BASED ON USER CLASS HIERARCHY

(71) Applicant: Citrix Systems, Inc., Fort Lauderdale, FL (US)

(72) Inventor: Michael Renkema, North Shore (NZ)

(73) Assignee: Citrix Systems, Inc., Fort Lauderdale, FL (US)

( * ) Notice: Subject to any disclaimer, the term of this patent is extended or adjusted under 35 U.S.C. 154(b) by 459 days.

(21) Appl. No.: 14/015,463

(22) Filed: Aug. 30, 2013

(65) Prior Publication Data

US 2015/0067142 A1 Mar. 5, 2015

(51) Int. Cl.
*G06F 11/30* (2006.01)
*G06F 11/34* (2006.01)
*H04L 12/26* (2006.01)

(52) U.S. Cl.
CPC ....... *G06F 11/3476* (2013.01); *G06F 11/3082* (2013.01); *G06F 11/3409* (2013.01); *H04L 43/06* (2013.01)

(58) Field of Classification Search
None
See application file for complete search history.

(56) References Cited

U.S. PATENT DOCUMENTS

| | | |
|---|---|---|
| 8,238,256 B2 | 8/2012 | Nugent |
| 2009/0271324 A1 | 10/2009 | Jandhyala et al. |
| 2011/0231552 A1 | 9/2011 | Carter et al. |
| 2013/0232146 A1* | 9/2013 | Dinger ............... G06F 11/3006 707/737 |
| 2014/0297836 A1* | 10/2014 | Cohen .................... H04L 67/22 709/224 |

* cited by examiner

*Primary Examiner* — Belix M Ortiz Ditren
(74) *Attorney, Agent, or Firm* — BainwoodHuang

(57) ABSTRACT

An improved technique involves collecting data from a hosting environment that provides access to electronic computing resources and computing aggregated metrics from the data for a particular level of a user class hierarchy by aggregating metric values collected for subordinate levels of the user class hierarchy. Along these lines, a tracking server, upon receiving resource usage data, arranges the data in entries having values of metrics that describe some attribute related to resource usage and pertaining to a user class hierarchy. For a given level of the user class hierarchy, the tracking server performs an aggregation operation (e.g., a summation) of metric values over entries pertaining to subordinate levels of the user class hierarchy. The tracking server stores the result of the aggregation operation in an aggregation table for future report generation.

17 Claims, 6 Drawing Sheets

Tracking Server 12 

Fact Table 80

| Type | Primary Key ID | Dimension Fields | | | | | Generic Metric Fields |
|---|---|---|---|---|---|---|---|
| | | Reseller ID | Customer ID | User ID | Service ID | Billable | Provisioned |
| T1 | 1 | 10 | | | 20 | 1 | 1 |
| T1 | 2 | 10 | | | 21 | 1 | 1 |
| T1 | 3 | 10 | | | 22 | 1 | 1 |
| T2 | 4 | 10 | 11 | | 20 | 1 | 1 |
| T2 | 5 | 10 | 11 | | 21 | 0 | 1 |
| T2 | 6 | 10 | 11 | | 22 | 1 | 1 |
| T3 | 7 | 10 | 11 | 12 | 20 | 1 | 1 |
| T3 | 8 | 10 | 11 | 12 | 21 | 0 | 1 |
| T3 | 9 | 10 | 11 | 12 | 22 | 1 | 1 |
| T3 | 10 | 10 | 11 | 13 | 20 | 0 | 0 |
| T3 | 11 | 10 | 11 | 13 | 21 | 1 | 1 |
| T3 | 12 | 10 | 11 | 13 | 22 | 1 | 1 |

Type-Specific Table 82

| Type | Primary Key ID | Foreign Key Fact Table ID | Type-Specific Metric Fields Mailbox Storage Limit in MB |
|---|---|---|---|
| T2 | 30 | 4 | 2000 |
| T2 | 31 | 5 | 1650 |
| T2 | 32 | 6 | 2350 |

Type-Specific Table 84

| Type | Primary Key ID | Foreign Key Fact Table ID | Type-Specific Metric Fields Mailbox Usage in MB |
|---|---|---|---|
| T3 | 40 | 7 | 300 |
| T3 | 41 | 8 | 550 |
| T3 | 42 | 9 | 450 |
| T3 | 43 | 10 | 0 |
| T3 | 44 | 11 | 100 |
| T3 | 45 | 12 | 200 |

Figure 4a

Aggregation Table 86

| Type | Dimension Fields ||||
| --- | --- | --- | --- | --- |
| | Reseller ID | Customer ID | Service ID | Billable |
| T1 | 10 | 11 | 20 | 0 |
| | 10 | 11 | 20 | 1 |
| | 10 | 11 | 21 | 0 |
| | 10 | 11 | 21 | 1 |
| | 10 | 11 | 22 | 1 |
| T2 | | 11 | 20 | 0 |
| | | 11 | 20 | 1 |
| | | 11 | 21 | 0 |
| | | 11 | 21 | 1 |
| | | 11 | 22 | 1 |

| T2 Metric Fields || T3 Metric Fields ||
| --- | --- | --- | --- |
| Provisioned | Mailbox Storage Limit in MB | Provisioned | Mailbox Usage in MB |
| 0 | 0 | 0 | 0 |
| 1 | 2000 | 1 | 300 |
| 1 | 1650 | 1 | 550 |
| 0 | 0 | 1 | 100 |
| 1 | 2350 | 2 | 650 |
| | | 0 | 0 |
| | | 1 | 300 |
| | | 1 | 550 |
| | | 1 | 100 |
| | | 2 | 650 |

Figure 4b

100 

```
┌─────────────────────────────────────────────────────┐
│ Receive data indicative of usage of the electronic computing │
│              resources by the users                 │
│                                              102    │
└─────────────────────────────────────────────────────┘
                          │
                          ▼
┌─────────────────────────────────────────────────────┐
│ Store the received data in a table, the table including multiple │
│ entries and multiple fields, the fields including a set of metric │
│  fields, each entry pertaining to a level of user class of a user │
│  class hierarchy and including a metric value for at least one of │
│            the metric fields of the table           │
│                                              104    │
└─────────────────────────────────────────────────────┘
                          │
                          ▼
┌─────────────────────────────────────────────────────┐
│ For a first set of the multiple entries in the table, perform an │
│  aggregation operation that aggregates metric values stored in │
│  a second set of the multiple entries in the table for at least one │
│    metric field of the set of metric fields to generate a set of │
│  aggregated metric values, wherein the first set of the multiple │
│   entries pertains to a particular level of the user class hierarchy │
│      and the second set of the multiple entries includes entries │
│        pertaining to a set of levels of the user class hierarchy │
│    subordinate to the particular level of the user class hierarchy │
│                                                     │
│                                              106    │
└─────────────────────────────────────────────────────┘
```

Figure 5

AGGREGATION OF METRICS FOR TRACKING ELECTRONIC COMPUTING RESOURCES BASED ON USER CLASS HIERARCHY

BACKGROUND

Cloud computing platforms allow users to access computing resources from remote locations. For example, a company that owns a significant amount of storage may make that storage available to remote users. The company would provide each user access to a certain amount of storage over a specified period of time. In another example, the company may operate a Microsoft Exchange® server and provide users with mailboxes in which they may store their email messages.

Such cloud computing platforms provide tools for tracking resource usage by the remote users. For example, the company providing storage to remote users may wish to monitor the amount of storage each user consumes for the purposes of ensuring adequate access. Conventional resource tracking tools collect and organize data relevant to the usage of the electronic computing resources and generate reports of resource usage. For example, such tracking tools store resource usage information in a database. When an administrator of the platform wishes to generate a usage report, a resource tracking tool performs a query of the database to extract desired usage information.

SUMMARY

Unfortunately, such resource tracking tools typically collect and organize resource usage data in an ad-hoc manner, which leads to inconsistent results in the generated reports, as well as a great deal of repeated effort.

Along these lines, consider a situation in which an entity offering electronic computing resources makes the resources available through a small group of entities. Each of those entities, in turn, may make their share of resources available to other, smaller sub-entities, or to organizations that employ potential users of the resources. Such a network of entities, sub-entities, organizations, and direct users each form a user class within a user class hierarchy, each level of which may require different reports. There are, however, many different ways to analyze data produced in such a hierarchy, each of which may produce different results for use in a report. This lack of consistency in generating reports makes it difficult to provide accurate usage tracking.

In contrast with the above-described conventional resource tracking tools that produce inconsistent results, an improved technique involves collecting data from a hosting environment that provides access to electronic computing resources and computing aggregated metrics from the data for a particular level of a user class hierarchy by aggregating metric values collected for subordinate levels of the user class hierarchy. Along these lines, a tracking server, upon receiving resource usage data, arranges the data in entries having metric values that describe some attribute related to resource usage and pertaining to a particular level of the user class hierarchy. The tracking server then performs an aggregation operation (e.g., a summation) of metric values over entries pertaining to subordinate levels of the user class hierarchy. The tracking server stores the result of the aggregation operation in an aggregation table for report generation.

Advantageously, the improved technique provides for a methodology that produces consistent results when generating reports of resource usage. By aggregating metric values in a manner sensitive to hierarchal relationships between levels of the user class hierarchy, reporting resource usage becomes consistent and repeatable, and duplicate efforts are eliminated.

One embodiment of the improved technique is directed to a method of tracking usage of the electronic computing resources by users in an electronic environment that makes electronic computing resources available to the users. The method includes receiving data indicative of usage of the electronic computing resources by the users. The method also includes storing the received data in a table, the table including multiple entries and multiple fields, the fields including a set of metric fields, each entry pertaining to a level of user class of a user class hierarchy and including a metric value for at least one of the metric fields of the table. The method further includes performing an aggregation operation that aggregates metric values stored in a second set of the multiple entries in the table for at least one metric field of the set of metric fields to generate a set of aggregated metric values for a first set of the multiple entries in the table. The first set of the multiple entries pertains to a particular level of the user class hierarchy and the second set of the multiple entries includes entries pertaining to a set of levels of the user class hierarchy subordinate to the particular level of the user class hierarchy.

Additionally, some embodiments of the improved technique are directed to an apparatus constructed and arranged to track usage of the electronic computing resources by users in an electronic environment that makes electronic computing resources available to the users. The apparatus includes memory and a set of processors coupled to the memory to form controlling circuitry. The controlling circuitry is constructed and arranged to carry out the method of tracking usage of the electronic computing resources by users in an electronic environment that makes electronic computing resources available to the users.

Furthermore, some embodiments of the improved technique are directed to a computer program product having a non-transitory computer readable storage medium which stores code including a set of instructions which, when executed by a computer, cause the computer to carry out the method of tracking usage of the electronic computing resources by users in an electronic environment that makes electronic computing resources available to the users.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4a is a block diagram illustrating example level-specific tables stored within the tracking server shown in FIG. 2.

FIG. 4b is a block diagram illustrating example level-specific tables stored within the tracking server shown in FIG. 2.

FIG. 5 is a flow chart illustrating an example method of carrying out the improved technique within the electronic environment shown in FIG. 1.

DETAILED DESCRIPTION

An improved technique involves collecting data from a hosting environment that provides access to electronic computing resources and computing aggregated metrics from the data for a particular level of a user class hierarchy.

Figure 1:
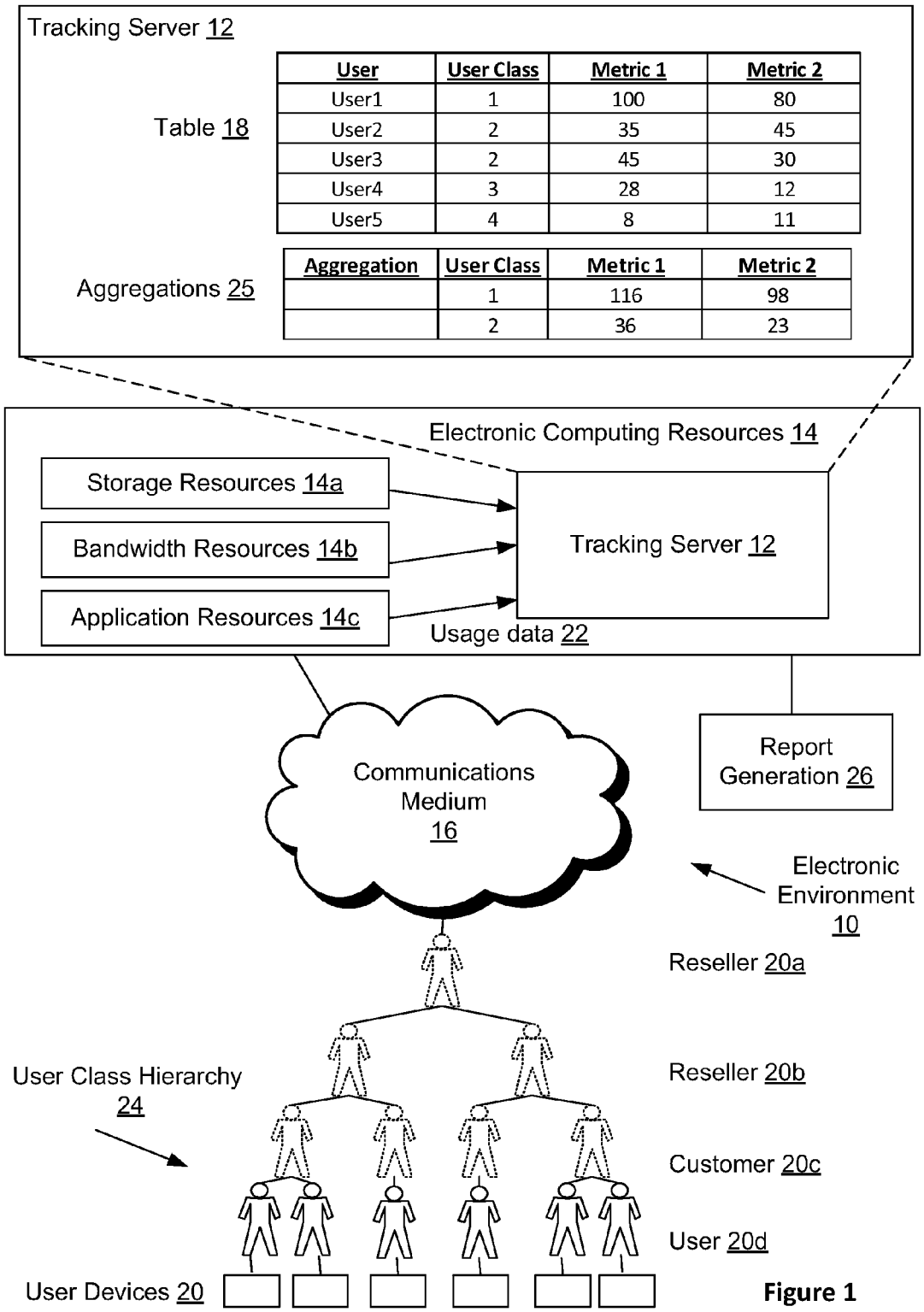
FIG. 1 is a block diagram illustrating an example electronic environment in which the improved technique may be carried out.

FIG. 1 illustrates an example electronic environment 10 in which the improved technique may be carried out. Electronic environment 10 includes tracking server 12, electronic computing resources 14, communications medium 16, and user devices 20.

Communications medium 16 can be any type of network or combination of networks, such as a storage area network (SAN), local area network (LAN), wide area network (WAN), the Internet, and/or some other type of network, for example. Communications medium 16 may implement a variety of protocols such as TCP/IP, UDP, ATM, Ethernet, Fibre Channel, combinations thereof, and the like. Furthermore, communications medium 16 may include various components (e.g., cables, switches/routers, gateways/bridges, NAS/SAN appliances/nodes, interfaces, etc.).

Tracking server 12 can be any type of server or computing device capable of tracking usage of electronic computing resources 14 by users of user devices 20. For example, tracking server 12 may be a database server capable of running a database. Alternatively, tracking server 12 may be a desktop computer, laptop computer, tablet computer, or smartphone capable of accessing information in such a database. Further, as pictured in FIG. 1, tracking server 12 may be collocated with electronic computing resources 14; in other arrangements, however, tracking server 12 may be in a location remote from electronic computing resources 14.

Electronic computing resources 14 can include any type of computing resource that may be made available to users of user devices 20 and which use may be measurable. Examples of such resources are storage resources 14a, bandwidth resources 14b, and application resources 14c.

Specifically, storage resources 14a may refer to disk storage that is allocated to entities and that may be further divided. For example, a 1000 GB partition of a disk may be allocated to a reseller 20a, who in turn may divide up that 1000 GB partition into two 500 GB partitions to be sold to sub-resellers 20b. The sub-resellers 20b then may sell their respective space to organizational customers 20c that must provide storage resources 14a to its respective users 20d.

Along the same lines, bandwidth resources 14b refers to amounts of data transfers per unit time to and from external networks for each user device 20. Further, application resources 14c refers to hosted applications such as Microsoft Exchange®. Note that these resources may be resold and divided as storage resources 14a. It should be understood, however, that other types of electronic computing resources may be made available and are not limited to those described above.

User devices 20 can include any type of electronic computing device that may access and use electronic computing resources 14. For example, user devices 20 may include desktop computers, servers, laptop computers, smartphones, tablet computers and the like. The users of user devices 20 form a hierarchy, as described above, of various user classes such as reseller 20a, sub-reseller 20b, customer 20c, and user 20d. It should be understood, however, that this is but one example of a user class hierarchy and other such hierarchies may be considered.

Also, it should be understood that, although each user 20d is associated with a physical machine, there may be no separate physical machine associated with each customer 20c or resellers 20a and 20b. Rather, customers and resellers form logical levels of the user class hierarchy. On the other hand, customers and resellers are real entities that, for example, may be allocated a certain amount of access to electronic computing resources 14. Nevertheless, from the perspective of user classes, the only entities actually consuming the resources are the users. Therefore, the users form the bottom of the hierarchy.

It should be understood that, within the user class hierarchy illustrated in FIG. 1, each user in a user class above the lowest level has his/her own child users. Each user has in addition to a direct hierarchical relationship to their immediate parent, an indirect hierarchical relationship to each level ascendant to the immediate parent.

During operation, tracking server 12 receives usage data 22 from electronic computing resources 14. Usage data 22 includes information indicative of usage of electronic computing resources 14 by user devices 20. For example, usage data 22 may include data pertaining to how much storage each user, identified by a user identifier, has consumed over the past week.

Upon receiving usage data 22, tracking server 12 stores usage data 22 in a table 18 in a predefined format defined by user class hierarchy 24. In the example illustrated in FIG. 1, table 18 groups together entries for users at the same level in user class hierarchy 24 in adjacent entries. It should be understood that, in some arrangements, these entries need not be grouped adjacently by level, as the values of the levels may be provided in a "User Class" field in the entries.

Each entry of table 18 as illustrated in the example of FIG. 1 also has values of two metrics, labeled "Metric 1" and 'Metric 2." It should be understood that the value of each metric corresponds to some measurable quantity associated with usage of electronic computing resources 14.

Once usage data 22 is placed in table 18, tracking server 12 performs aggregation operations on the values of the metrics according to level in user class hierarchy 24. For example, FIG. 1 illustrates an aggregation operation for level 1 of user class hierarchy 24; in this case, tracking server 12 sums the values of a metric for all entries pertaining to levels of user class hierarchy 24 subordinate to level 1 (i.e., level 2, level 3, etc.). Similarly, the aggregation of the metric values of an entry at level 2 includes aggregating metric values for all entries pertaining to levels of user class hierarchy 24 subordinate to level 2 (i.e., level 3, etc.).

It should be understood that the aggregation operations described above may be provided in the form of sums over the metric values. In some arrangements, however, these aggregation operations produce a single aggregated value other than a sum, such as a standard deviation, a median, or the like.

Tracking server 12 places the results of these aggregation operations in an aggregation table 25. Aggregation table 25 includes entries, each of which contain a level of user class hierarchy 24 and results of an aggregation operation as described above for that level. Tracking server 12 makes entries of aggregation table 25 available for later report generation 26.

Figure 2:
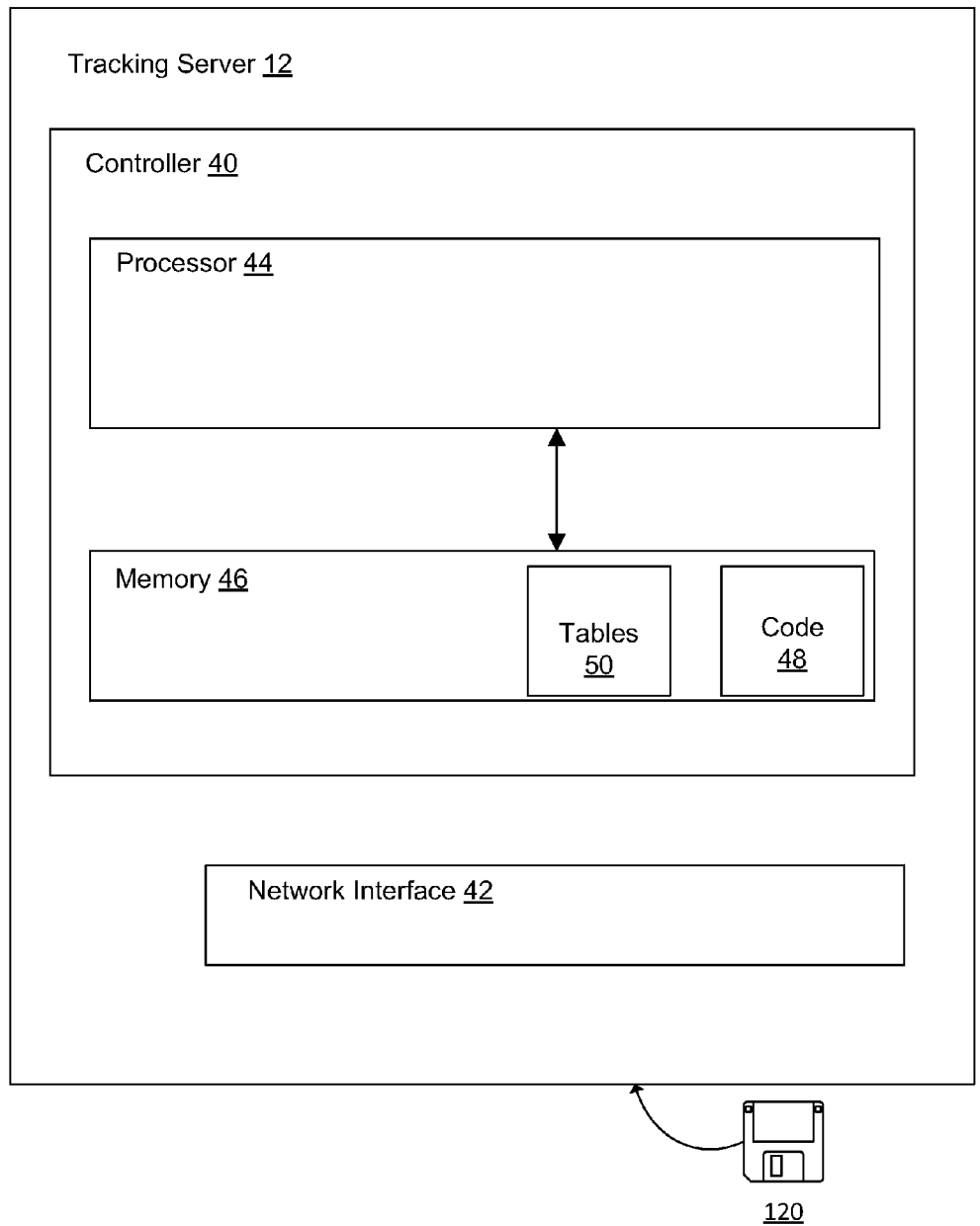
FIG. 2 is a block diagram illustrating an example tracking server within the electronic environment shown in FIG. 1.

FIG. 2 illustrates further example details of tracking server 12. Tracking server 12 includes controller 40, which in turn includes processor 44, memory 46, and a network interface 42.

In an example, network interface 42 takes the form of an Ethernet card. In other examples, network interface 42 takes other forms, such as a wireless transceiver or a token ring card.

Processor 44 takes the form of one or more processing chips and/or assemblies. Processor 44 is coupled to memory 46 and is configured to execute instructions from code 48.

Memory 46 is configured to store code 48 configured to track usage of electronic computing resources 14 and tables 50 (e.g., tables 18 and 24) that contain usage data 22 and its aggregations. Memory 46 includes both volatile and non-volatile memory such as random access memory, magnetic disk drives, and/or flash memory, for example. Further examples of tables 50 stored in memory 46 are described below with respect to FIGS. 3 and 4.

Figure 3:
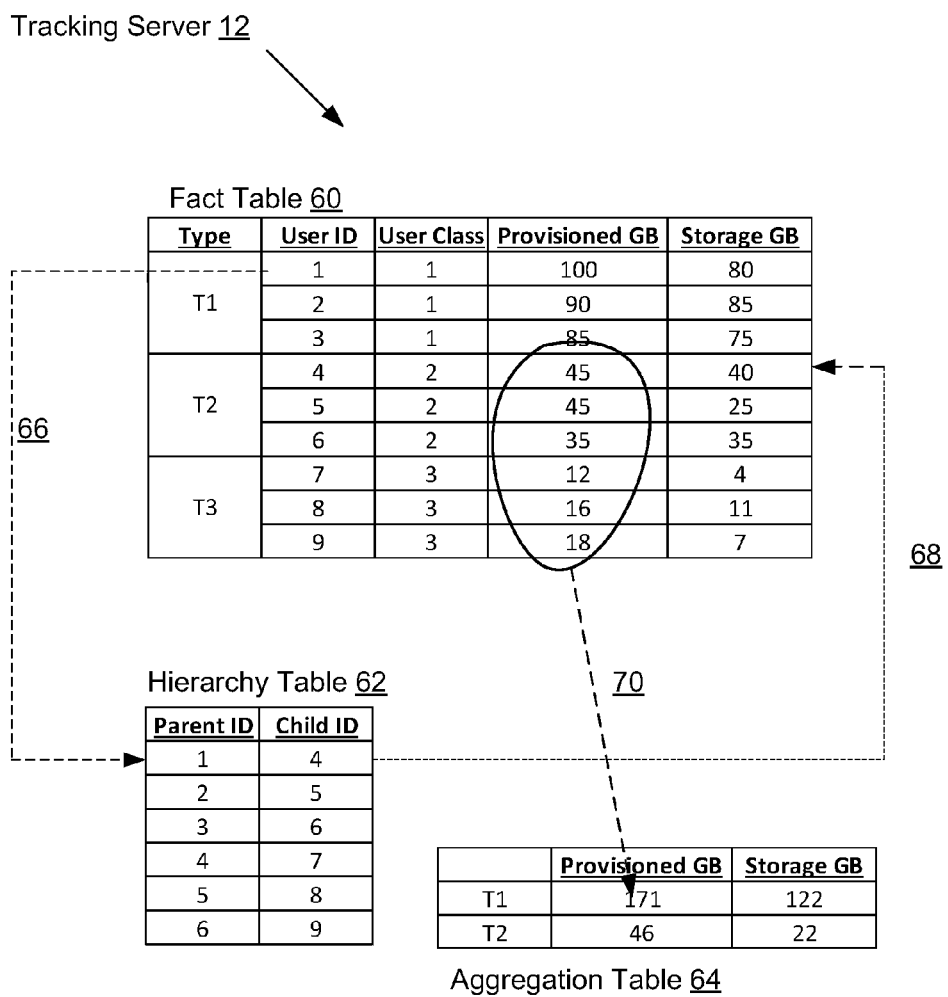
FIG. 3 is a block diagram illustrating an example hierarchy table stored within the tracking server shown in FIG. 2.

FIG. 3 illustrates an example implementation of tables 50 for tracking usage of electronic computing resources 14. Within memory 46 of tracking server 12 is stored a fact table 60 that contains usage data 22 organized according to levels of user class hierarchy 24, as described above in connection with FIG. 1. Further stored in memory 46 are hierarchy table 62 and aggregation table 64.

Fact table 60 is a specific instance of table 18 configured to store information about usage of storage resources 14a. Fact table 60 contains entries organized according to type, which in this case is a level in user class hierarchy 24. Specifically, each entry of fact table 60 is associated with a user having a value of a user ID and user class (i.e., level of user class hierarchy 24). Each entry having a user class value of 1 is of type T1 and pertains to the first level in user class hierarchy 24, and so on. Metrics considered in fact table 60 include provisioned storage in GB and storage used in GB.

Not directly expressed within fact table 60, however, are specific parent-child relationships between the users. For example, as illustrated in FIG. 1, a particular reseller has his own customers through which the users access electronic computing resources 14 Tracking server 12 uses information about the specific parent-child relationships to perform aggregations over subordinate levels in user class hierarchy 24.

In an example, hierarchy table 62 is separate from fact table 60 and contains information about these parent-child relationships. In some arrangements, however, these parent-child relationships may be referenced directly in fact table 60. Hierarchy table 62 includes a parent ID field and a child ID field. The values of each of these fields are User ID values from fact table 60.

Also stored in memory 46 is aggregation table 64 which contains results of aggregations of each metric for each type in fact table 60.

During an aggregation operation for, say, an entry pertaining to type T1, tracking server 12 performs a lookup operation 66 within the parent ID field in hierarchy table 62 for the user ID value of that entry. For example, if the user ID value of the entry is 1, then the result of lookup operation is a value of corresponding child ID, or 4. Tracking server 12 then performs a lookup operation 68 within fact table 60 on the user ID field and locates the entry having a user ID value of 4.

In order to aggregate over all subordinate levels to the entry having a user ID value of 1, lookup operation 66 also involves extracting children of the entry having a user ID value of 4, i.e., grandchildren of the original entry. For example, in hierarchy table 62, parent ID value 4 corresponds to child ID value 7; thus, the entry having a user ID value of 7 is a descendant of the entry having a user ID value of 1. Tracking server 12 recursively performs lookup operation 66 until all descendants of the original entry have been found.

In some arrangements, however, descendants found in recursive lookup operation 66 as described in the preceding paragraph will be input to hierarchy table 62. In that case, hierarchy table 62 contains an additional depth field that specifies what level descendant a child having a child ID value corresponding to the parent ID value is. For example, an entry having a parent ID value of 1 and child ID value of 4 would have a depth value of 1, as would an entry having a parent ID value of 4 and a child ID value of 7, while an entry with a parent ID value of 4 and a child ID value of 7 would have a depth value of 2, because the relationship is actually parent-grandchild.

Once tracking server 12 retrieves the user ID values of the descendants of the original entry, tracking server performs lookup operation 68 to extract values of metrics of the entries of fact table 60 matching the descendant user ID values. Once tracking server 12 extracts these metric values, tracking server 12 performs an aggregation operation 70 on those values and inputs the result of aggregation operation 70 into aggregation table 64. In the example illustrated in aggregation table 64 of FIG. 3, aggregation operation 70 is performed over all entries descendant to type T1 to produce aggregate values that correspond to type T1, and similarly aggregation operation 70 is performed over all entries descendant to type T2 to produce aggregate values that correspond to type T2. Nevertheless, in some arrangements, aggregation table 64 may contain a field for the specific User ID values for which aggregation operation 70 has been carried out, enabling aggregate values for each User ID to be retrieved.

In some arrangements, user data 22 contains additional information about the type and level of service provided to each user. Such additional information may be encapsulated in dimension fields of the fact table or through other, type-specific tables; such fields and tables are discussed below in connection with FIG. 4.

FIGS. 4a and 4b illustrates another fact table 80 stored in memory 46 (see FIG. 2) arranged by type as described above. In addition, memory 46 stores type-specific tables 82 and 84, as well as aggregation table 86.

Fact table 80, similar to fact table 60 (see FIG. 3), contains entries arranged by type and having values of a user ID that corresponds to a user. It is recognized that the User ID field of fact table 80 is one example of a dimension field that identifies the entries of fact table 80. Fact table 80, however, contains additional dimension fields such as a service ID field that identifies a service associated with access to electronic computing resources 14 (see FIG. 1), and a billable field, the values of which are Boolean and identify whether the service in question is billable. Other dimension fields that pertain to any aspect of providing access to electronic computing resources 14 may be included in fact table 80.

Because fact table 80 may contain multiple entries for each user ID value, user ID value is not a unique key value that refers to a particular entry of fact table 80. Rather, fact table 80 includes a primary key field that is a unique identifier for each entry of fact table 80. As illustrated in FIGS. 4a and 4b, the values of the primary key field are sequentially ordered numbers. In some arrangements, however, the values of the primary key field can be a textual value or some other number. In other arrangements, the value of the primary key field can be expressed in terms of the values of the dimension fields, e.g., a combination of values of the dimension fields.

It should be understood that each value of the user ID may be associated with several entries of fact table 80. Each of those entries may pertain to various combinations of values of dimension fields, for example, where each entry in the table represents the association between a user and a service.

It should also be understood that the metric fields of fact table 80 are generic metric fields that pertain to all levels of user class in user class hierarchy 24 (see FIG. 1). In this case, where the arrangement is such that many services are represented by the entries in fact table 80, a generic metric may indicate that a user is a consumer of the service represented by the entry. An example of a service that may be provided to a user is a mailbox provided by the Microsoft Exchange application. The generic metric named Provisioned as shown in fact table 80 may be aggregated to produce a count of mailboxes for customer or reseller, which are higher levels in the user class hierarchy.

It should be understood that the dimension fields Reseller ID and Customer ID have been added to fact table 80 and populated with identifiers of user classes T1 and T2, respectively.

In contrast to the example given in FIG. 3, provisioned and consumed storage space in GB are not relevant to all levels of user class hierarchy 24 and to all services. These metrics that pertain only to a specific level of user class in user class hierarchy 24 (see FIG. 1) may be added as fields to a type-specific table such as table 82. Type-specific table 82 includes a foreign key that is used to associate each entry in the type-specific table to an entry in the fact table 80. Metrics that are specific to type T2 include Mailbox Storage Limit in MB, which represents the total amount of storage space that has been allocated to the user class and that may apportioned to subordinate user classes from the user class hierarchy.

Type-specific table 84 is similarly composed as type-specific table 82, except that the type-specific metric in this table relates to an amount of mailbox storage used in MB.

Aggregation table 86 includes a set of entries. Each entry pertains to a type, a set of dimension field values over which aggregation of the metric field values is taken, and a set of aggregated values of both generic and type-specific metrics. It should be understood that dimension fields play a role in database functions such as GROUP BY. Using these functions, one may perform a sum over particular values of a metric specified by the argument of the SELECT function. The set of dimension fields is used as an argument to the GROUP BY function to convert a large number of entries into a smaller number of entries where matching dimension values are found, and the metric values are aggregated together based on the resultant grouping where duplicates are found.

During operation, tracking server 12 identifies a type over which it will perform an aggregation operation. Tracking server 12 then performs a lookup operation as described above in connection with FIG. 3 to find the descendant entries of that type. Tracking server 12 then performs an aggregation operation on the metric values in fact table 80 for each descendant type to sum the metric values from all entries of the descendant types in turn, grouping the results based on the set of dimension fields. Tracking server 12 also extracts the primary key identifiers of these descendant entries, performs a lookup operation on type-specific tables 82 and 84, and performs aggregation operations on these entries, grouping the results based on the set of dimension fields from fact table 80. Tracking server 12 then records the results of the aggregation operations as well as the dimension field values specified to aggregation table 86.

FIG. 5 illustrates an example method 100 of tracking usage of the electronic computing resources by the users in an electronic environment that makes electronic computing resources available to users, including steps 102, 104, and 106. In step 102, data indicative of usage of the electronic computing resources by the users is received, for example, by tracking server 12. In step 104, the received data is stored in a table, the table including multiple entries and multiple fields, the fields including a set of metric fields, each entry pertaining to a level of user class of a user class hierarchy and including a metric value for at least one of the metric fields of the table. In step 106, for a first set of the multiple entries in the table, an aggregation operation is performed that aggregates metric values stored in a second set of the multiple entries in the table for at least one metric field of the set of metric fields to generate a set of aggregated metric values, wherein the first set of the multiple entries pertains to a particular level of the user class hierarchy and the second set of the multiple entries includes entries pertaining to a set of levels of the user class hierarchy subordinate to the particular level of the user class hierarchy.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including real-time adjustment of allocation of electronic computer resources, verification that access of such resources is adequate, billing, and dynamic allocation of resources when new equipment is introduced and old equipment is retired.

Having described certain embodiments, numerous alternative embodiments or variations can be made. For example, the above discussion dealt mainly with storing the tables in memory 46. In some arrangements, however, tracking server 12 may store the tables in an external database which it updates as needed.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 120 of FIG. 2). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. In an electronic environment that makes electronic computing resources available to users, a method of tracking usage of the electronic computing resources by the users, the method comprising:

receiving data indicative of usage of the electronic computing resources by the users;

storing the received data in a fact table, the fact table including multiple entries and multiple fields, the fields including a set of metric fields, each entry pertaining to a level of user class of a user class hierarchy and including a metric value for at least one of the metric fields of the table;

creating a hierarchy table including multiple entries, a parent identifier field, and a child identifier field, each of the multiple entries of the hierarchy table associating a respective pair of entries of the fact table and including a parent value for the parent identifier field and a child value for the child identifier field, the parent value of the parent identifier field identifying a first entry of the fact table pertaining to a first user class of the user class hierarchy, the child value of the child identifier field identifying a second entry in the fact table pertaining to a second user class of the user class hierarchy, the second user class being subordinate to the first user class;

for a first set of the multiple entries in the fact table, performing an aggregation operation that aggregates metric values stored in a second set of the multiple entries in the fact table for at least one metric field of the set of metric fields to generate a set of aggregated metric values, wherein the first set of the multiple entries pertains to a particular level of the user class hierarchy and the second set of the multiple entries includes entries pertaining to a set of levels of the user class hierarchy subordinate to the particular level of the user class hierarchy, wherein performing the aggregation operation includes:

for each of the first set of the multiple entries in the fact table, locating entries of the hierarchy table having a parent value identifying the respective entry of the fact table, and obtaining the values of the metric fields in the entries of the table identified by the values of the child identifier field.

2. A method as in claim 1, wherein the fact table further includes a primary key, each entry of the fact table including a value of the primary key, the value of the primary key of that entry being unique to that entry;

wherein locating the entry of the hierarchy table having a value of the parent identifier field identifying that entry of the fact table includes:

performing a lookup operation on the parent identifier field by the value of the primary key of that entry of the fact table.

3. A method as in claim 1, wherein the fact table further includes a set of dimension fields, each entry of the fact table further including a dimension value for at least one of the dimension fields of the fact table;

wherein storing the received data in the table includes:
arranging each of the set of dimension fields in a column of the fact table.

4. A method as in claim 3, wherein the set of metric fields stores a set of generic metric fields, each of the set of generic metric fields being presented to all entries of the fact table, independent of the level of the user class hierarchy to which an entry pertains;

wherein each of a set of user level-specific metric fields are stored in a respective level-specific table distinct from the fact table, each of the set of level-specific fields being unique to a specific level of the user class hierarchy to which an entry pertains; and wherein performing the aggregation operation includes:

aggregating values for generic metric fields of the set of generic metric fields of entries of the fact table to generate a respective set of aggregated generic metrics, the entries pertaining to all levels of the set of levels of the user class hierarchy subordinate to the particular level of the user class hierarchy, and aggregating values for level-specific metric fields of the set of level-specific metric fields of entries of the respective level-specific metric table to generate a respective set of aggregated level-specific metrics, the entries pertaining to all levels of the set of levels of the user class hierarchy subordinate to the particular level of the user class hierarchy.

5. A method as in claim 4, wherein aggregating the values for the generic metric fields includes:

performing a selection operation on a generic metric field, the selection operation selecting the generic metric field as the metric field over which aggregation is to be carried out, and performing a grouping operation on the dimension fields of the set of dimension fields of the table, the grouping operation causing the aggregation operation to be carried out over at least one of the dimension fields of the fact table; and wherein aggregating the values for the level-specific metric fields includes:

performing a selection operation on a level-specific metric field, the selection operation selecting the generic metric field as the metric field over which aggregation is to be carried out, and performing a grouping operation on the dimension fields of the set of dimension fields of the table, the grouping operation causing the aggregation operation to be carried out over at least one of the dimension fields of the fact table.

6. A method as in claim 5, further comprising:

for each level of the set of levels of the user class hierarchy, inputting each of the aggregated generic metrics and each of the aggregated level-specific metrics into an entry of an aggregation table; and generating a report of usage of electronic computing resources based on the entries of the aggregation table for a level of user class in the user class hierarchy.

7. A method as in claim 1, wherein values for a metric field of the set of metric fields include a measured quantity of an electronic computing resource; and wherein performing the aggregation operation includes:

adding the values for the metric field of multiple entries of the set of entries to generate, as the respective aggregated metric, a sum over the values.

8. A method as in claim 7,
wherein values for a metric field of the set of metric fields include a Boolean value indicative of a state of a service pertaining to an electronic computing resource; and
wherein performing the aggregation operation includes:
adding the values for the metric field of multiple entries of the set of entries to generate, as the respective aggregated metric, a sum over the values.

9. In an electronic environment that makes electronic computing resources available to users, an apparatus constructed and arranged to track usage of the electronic computing resources by the users, the apparatus comprising:
a network interface;
memory; and
a controller including controlling circuitry coupled to the memory, the controlling circuitry being constructed and arranged to:
receive, over the network interface, data indicative of usage of the electronic computing resources by the users;
store the received data in a fact table, the fact table including multiple entries and multiple fields, the fields including a set of metric fields, each entry pertaining to a level of user class of a user class hierarchy and including a metric value for at least one of the metric fields of the fact table;
create a hierarchy table including multiple entries, a parent identifier field, and a child identifier field, each of the multiple entries of the hierarchy table associating a respective pair of entries of the fact table and including a parent value for the parent identifier field and a child value for the child identifier field, the parent value of the parent identifier field identifying a first entry of the fact table pertaining to a first user class of the user class hierarchy, the child value of the child identifier field identifying a second entry in the fact table pertaining to a second user class of the user class hierarchy, the second user class being subordinate to the first user class:
for a first set of the multiple entries in the table, perform an aggregation operation that aggregates metric values stored in a second set of the multiple entries in the fact table for at least one metric field of the set of metric fields to generate a set of aggregated metric values,
wherein the first set of the multiple entries pertains to a particular level of the user class hierarchy and the second set of the multiple entries includes entries pertaining to a set of levels of the user class hierarchy subordinate to the particular level of the user class hierarchy; and
wherein the controlling circuitry constructed and arranged to perform the aggregation operation is further constructed and arranged to:
for each of the first set of the multiple entries in the fact table, locate entries of the hierarchy table having a parent value identifying the respective entry of the fact table, and
obtain the values of the metric fields in the entries of the table identified by the values of the child identifier field.

10. An apparatus as in claim 9,
wherein the fact table further includes a primary key, each entry of the fact table including a value of the primary key, the value of the primary key of that entry being unique to that entry; and
wherein the controlling circuitry constructed and arranged to locate the entry of the hierarchy table having a value of the parent identifier field identifying that entry of the fact table is further constructed and arranged to:
perform a lookup operation on the parent identifier field by the value of the primary key of that entry of the table.

11. An apparatus as in claim 9,
wherein the fact table further includes a set of dimension fields, each entry of the fact table further including a dimension value for at least one of the dimension fields of the fact table;
wherein the controlling circuitry constructed and arranged to store the received data in the table is further constructed and arranged to:
arrange each of the set of dimension fields in a column of the fact table.

12. An apparatus as in claim 11,
wherein the set of metric fields stores a set of generic metric fields, each of the set of generic metric fields being presented to all entries of the fact table, independent of the level of the user class hierarchy to which an entry pertains;
wherein each of a set of user level-specific metric fields are stored in a respective level-specific table distinct from the fact table, each of the set of level-specific fields being unique to a specific level of the user class hierarchy to which an entry pertains; and
wherein the controlling circuitry constructed and arranged to perform the aggregation operation is further constructed and arranged to:
aggregate values for generic metric fields of the set of generic metric fields of entries of the fact table to generate a respective set of aggregated generic metrics, the entries pertaining to all levels of the set of levels of the user class hierarchy subordinate to the particular level of the user class hierarchy, and
aggregate values for level-specific metric fields of the set of level-specific metric fields of entries of the respective level-specific metric table to generate a respective set of aggregated level-specific metrics, the entries pertaining to all levels of the set of levels of the user class hierarchy subordinate to the particular level of the user class hierarchy.

13. An apparatus as in claim 12,
wherein the controlling circuitry constructed and arranged to aggregate the values for the generic metric fields is further constructed and arranged to:
perform a selection operation on a generic metric field, the selection operation selecting the generic metric field as the metric field over which aggregation is to be carried out, and
perform a grouping operation on the dimension fields of the set of dimension fields of the table, the grouping operation causing the aggregation operation to be carried out over at least one of the dimension fields of the fact table; and
wherein aggregating the values for the level-specific metric fields includes:
perform a selection operation on a level-specific metric field, the selection operation selecting the generic metric field as the metric field over which aggregation is to be carried out, and
perform a grouping operation on the dimension fields of the set of dimension fields of the table, the grouping operation causing the aggregation operation to be carried out over at least one of the dimension fields of the fact table.

14. An apparatus as in claim 13, wherein the controlling circuitry is further constructed and arranged to:
for each level of the set of levels of the user class hierarchy, input each of the aggregated generic metrics and each of the aggregated level-specific metrics into an entry of an aggregation table; and
generate a report of usage of electronic computing resources based on the entries of the aggregation table for a level of user class in the user class hierarchy.

15. An apparatus as in claim 9,
wherein values for a metric field of the set of metric fields include a measured quantity of an electronic computing resource; and
wherein the controlling circuitry constructed and arranged to perform the aggregation operation is further constructed and arranged to:
add the values for the metric field of multiple entries of the set of entries to generate, as the respective aggregated metric, a sum over the values.

16. An apparatus as in claim 15,
wherein values for a metric field of the set of metric fields include a Boolean value indicative of a state of a service pertaining to an electronic computing resource; and
wherein the controlling circuitry constructed and arranged to perform the aggregation operation is further constructed and arranged to:
add the values for the metric field of multiple entries of the set of entries to generate, as the respective aggregated metric, a sum over the values.

17. In an electronic environment that makes electronic computing resources available to users, a computer program product having a non-transitory, computer-readable storage medium which stores instructions which, when executed by a computer, cause the computer to perform a method of tracking usage of the electronic computing resources by the tenants, the method comprising:
receiving data indicative of usage of the electronic computing resources by the users;
storing the received data in a fact table, the fact table including multiple entries and multiple fields, the fields including a set of metric fields, each entry pertaining to a level of user class of a user class hierarchy and including a metric value for at least one of the metric fields of the fact table;
creating a hierarchy table including multiple entries, a parent identifier field, and a child identifier field, each of the multiple entries of the hierarchy table associating a respective pair of entries of the fact table and including a parent value for the parent identifier field and a child value for the child identifier field, the parent value of the parent identifier field identifying a first entry of the fact table pertaining to a first user class of the user class hierarchy, the child value of the child identifier field identifying a second entry in the fact table pertaining to a second user class of the user class hierarchy, the second user class being subordinate to the first user class; and
for a first set of the multiple entries in the fact table, performing an aggregation operation that aggregates metric values stored in a second set of the multiple entries in the fact table for at least one metric field of the set of metric fields to generate a set of aggregated metric values,
wherein the first set of the multiple entries pertains to a particular level of the user class hierarchy and the second set of the multiple entries includes entries pertaining to a set of levels of the user class hierarchy subordinate to the particular level of the user class hierarchy, wherein performing the aggregation operation includes:
for each of the first set of the multiple entries in the fact table, locating entries of the hierarchy table having a parent value identifying the respective entry of the fact table, and
obtaining the values of the metric fields in the entries of the table identified by the values of the child identifier field.

* * * * *